June 3, 1952 — I. GREEN — 2,598,906
REVOLVING PILLAR SHELLS
Filed July 23, 1948
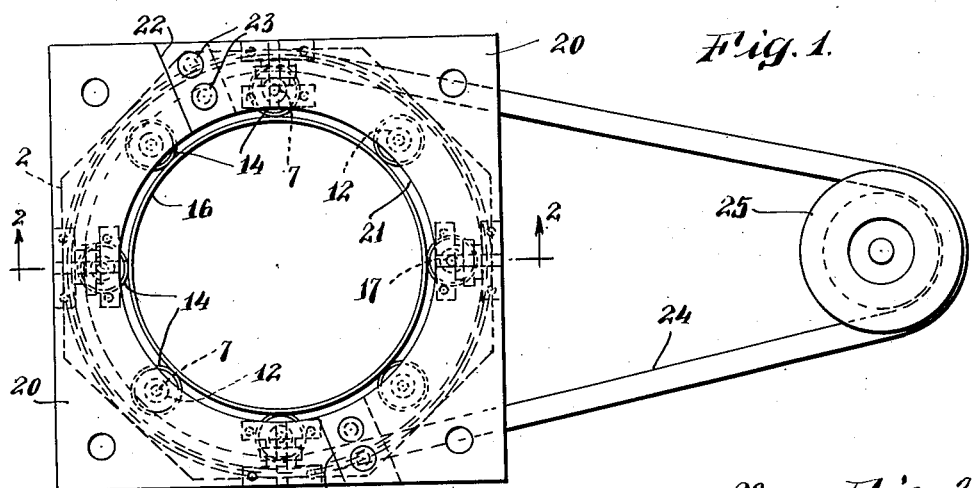
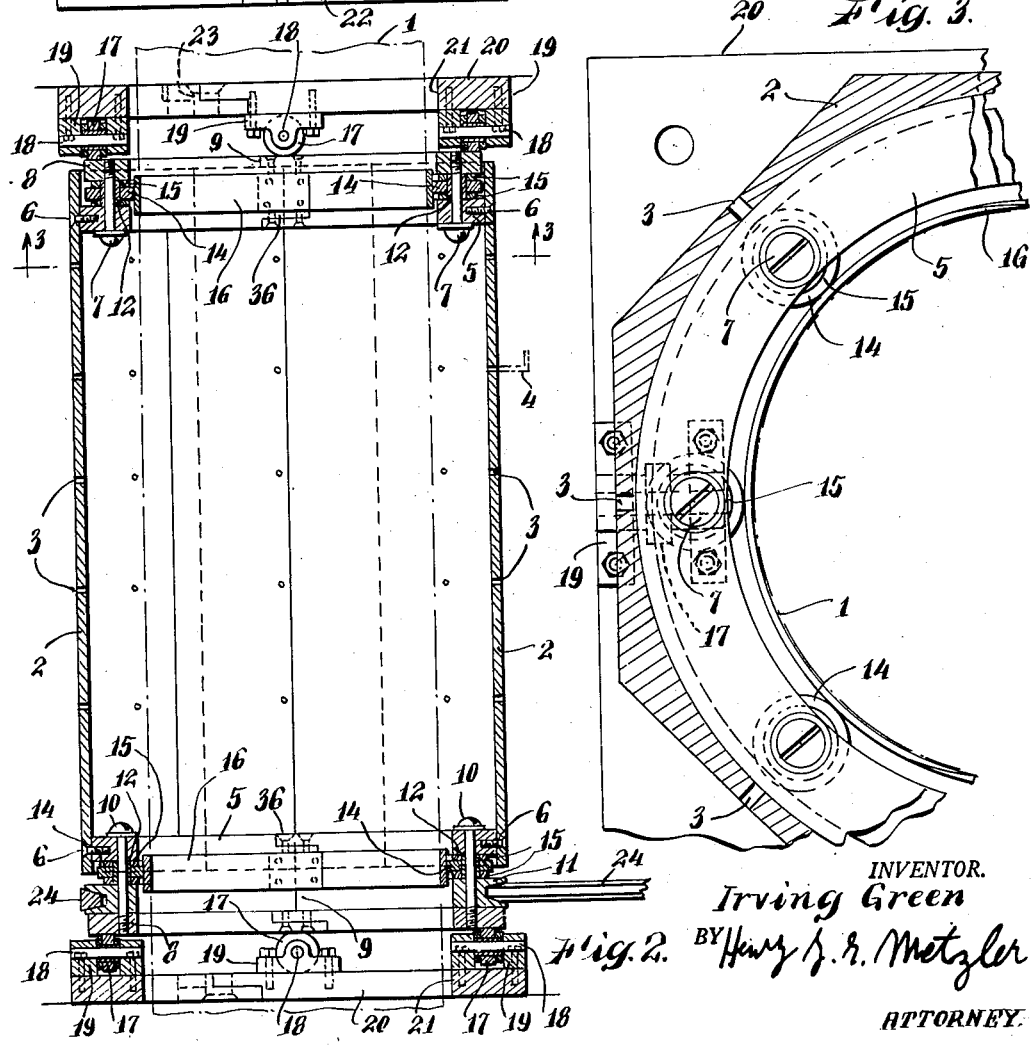
INVENTOR.
Irving Green
BY Henry J. R. Metzler
ATTORNEY Patented June 3, 1952

2,598,906

UNITED STATES PATENT OFFICE 2,598,906

REVOLVING PILLAR SHELL

Irving Green, New York, N. Y.

Application July 23, 1948, Serial No. 40,354

1 Claim. (Cl. 40—33)

This invention relates to a display stand for articles of merchandise, such, for instance, as jewelry or any other articles and, specifically to a revolving pillar shell. Show windows, display spaces, and the like frequently have structural elements such as vertical pillars, posts, or the like extended therethrough, which cannot be removed without expensive structural alterations, and which are unsightly and are in the way of the decorator of a window, display space, or the like.

Therefore, one object of the present invention is the provision of a device of the character described which will not only conceal such structural elements, but also will make it possible to utilize the space around a pillar or the like in a highly attractive manner for display and advertising purposes.

It is a further object to provide a display stand which may be constantly in motion thereby to attract the attention of an observer, and for this purpose, I mount the display stand for rotation about a pillar, post or the like.

It is a further object to provide a display stand of the character set forth, which is of simple construction and which can be readily assembled and collapsed to facilitate its installation and removal.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Figure 1 is a top plan view of a preferred embodiment of my invention;

Fig. 2 is a sectional view on the line 2—2 of Fig. 1; and

Fig. 3 is an enlarged fractional cross-sectional view on the line 3—3 of Fig. 2.

Similar reference characters refer to similar parts throughout the several views.

In the drawing the numeral 1 denotes a pillar or any other vertical stationary object which is indicated in dash-and-dotted lines in Figs. 2 and 3, and around which is mounted by new and improved display device. I prefer to call the latter a "revolving pillar shell." It comprises a cylindrical jacket consisting of shells 2, which are shaped as sectors of a circle in cross-section, or which are semi-circular in cross-section, as in the instance shown. The outer side of each shell 2 is polygonal as shown, or round, or of any other suitable shape or design, and is of an attractive appearance, or mirrored or glazed, or the like. The shells 2 are of such a length that they cover entirely that portion of a pillar 1 which normally is visible through a show window or the like. I prefer to provide the shells 2 with a plurality of bores 3 for inserting therein hooks 4 (Fig. 2) or any other suitable means for fastening thereon articles which are to be displayed.

The shells 2 are secured to frame-wheel members 5, by means of screws 6 (Fig. 2) or by any other suitable means. Each of the members 5 consists of at least two sectors, so that they can be placed around the pillar 1.

The sectors of the members 5 are joined at 36 by means of screws or the like extended through overlapping reduced extremities of the members 5. Vertical bolts 7 and 10 are extended through perforations in the members 5 and are screwed into ring members 8, each of which consists of at least two sectors, so that they can be placed around the pillar 1. The sectors of the ring members 8, similar to the members 5, are joined to one another at 9 by means of screws or the like extended through overlapping reduced extremities of the members 8. The bolts 10 are extended also through perforations in a sectional pulley 11 (Fig. 2), and horizontal anti-friction means provided on the bolts 7 and 10 are interposed between the members 5 and 8 or the pulley 11 respectively. I prefer to carry out this feature of my invention in the manner shown in the drawing, where it will be seen that the bolts 7 and 10 extend through sleeves 12 which keep the parts 5 and 8, and 5 and 11 respectively, in spaced relation to one another; and rollers 14 are rotatable on the sleeves 12 between washers 15. The rollers 14 may be provided with bearing bushings, or if the device is of a very large size with ball bearings or roller bearings or the like. The rollers 14 may roll directly upon the post or pillar 1, but I prefer to provide the post or pillar 1 with sleeve members 16 having smooth circular outer surfaces. At least beneath the lower member 8, preferably also above the upper member 8 as shown, there are arranged rollers 17 on horizontal axes 18 in bearings 19, which may be ball bearings or the like, and which are secured to plates 20 provided with central bores 21 of substantially the same diameter as said ring members and being divided along a horizontal center line 22.

The sections of each plate 20 have reduced extremities which are overlapped and joined to one another by means of screws 23 or the like after the plates 20 have been placed around the post 1. While there are shown in the present instance four rollers 17 at each end portion of the shells 2, it will be obvious that more or fewer rollers 17 can be provided for according to the size and weight of the device. Also the type of bearings 19 and the construction of the rollers 17 will be made in accordance with the dimensions and the weight of the device.

A belt 24 connects the pulley 11 to another pulley 25 which is driven by a motor (not shown) or the like. Instead of the belt 24 and the pulleys 11 and 25 there can be used gears, worm gears, sprocket wheels and a chain, or any other driving means, and casters or any other anti-friction means can be substituted for the rollers 17.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

A device of the character described comprising an upright cylindrical jacket consisting of shells which are semi-circular in cross-section, a pair of horizontal wheel members each of which consists of two semi-circular sections provided with a plurality of vertical apertures and one of said wheel members being secured to the inner side of the upper end of said jacket while the other is secured to the inner side of the lower end of said jacket, vertical bolts being extended through said apertures in said wheel members beyond the upper side of the wheel member which is at the upper end of said jacket as well as beyond the lower side of the wheel member which is at the lower side of said jacket, bushings partially encompassing those portion of said bolts which extend beyond said wheel members, a sectional horizontal pulley having perforations which register with the apertures in said wheel members being adjacent the bushings at the lower end of said jacket and having the bolts at the lower end of said jacket extended through said perforations, a pair of sectional horizontal ring members having vertical threaded holes which register with the apertures in said wheel members and into the holes of one of said ring members there being screwed the ends of the bolts at the upper end of said jacket while the other ring member is adjacent the lower side of said horizontal pulley and having screwed into its holes the bolts at the lower end of said jacket, horizontal rollers being rotatable on said bolts between said wheel members and said ring members and being so located that they protrude into the space encompassed by said ring members, sleeve members having swooth circular outer surfaces being provided adjacent said horizontal rollers on a stationary object which extends through said jacket as well as through said wheel and ring members, vertical rollers revolving around horizontal axes being arranged adjacent said ring members for rotatably supporting the latter and said jacket, and plates on which said vertical rollers are rotatably mounted being provided with bores of the same diameter as said ring members and being divided along a horizontal center line.

IRVING GREEN.

REFERENCES CITED

The following references are of record in the file of this patent:

UNITED STATES PATENTS

| Number | Name | Date |
| --- | --- | --- |
| 452,663 | Cleveland | May 19, 1891 |
| 459,592 | Pearce | Sept. 15, 1891 |
| 548,555 | Joski | Oct. 22, 1895 |
| 557,393 | Joski et al. | Mar. 31, 1896 |
| 2,075,245 | Van Schuck | Mar. 30, 1937 |
| 2,084,808 | Hyde | June 22, 1937 |
| 2,235,927 | Handley | Mar. 25, 1941 |
| 2,320,151 | McConaughy | May 25, 1943 |

FOREIGN PATENTS

| Number | Country | Date |
| --- | --- | --- |
| 406,220 | France | Jan. 25, 1910 |